Feb. 7, 1950     W. L. HAYDEN     2,496,393
MOUSE AND RAT TRAP
Filed Nov. 16, 1946
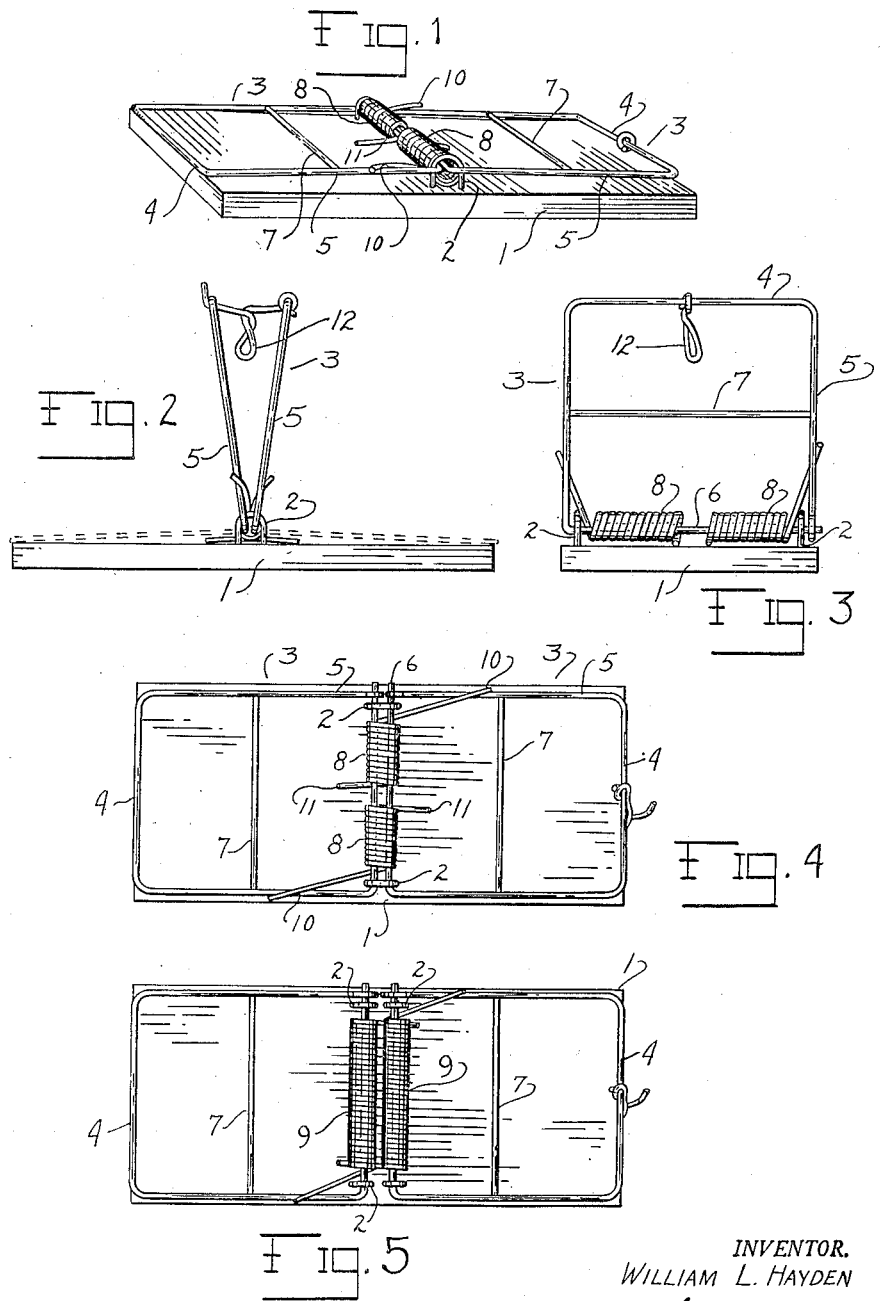
INVENTOR.
WILLIAM L. HAYDEN
BY Joshua R. H. Potts
HIS ATTORNEY Patented Feb. 7, 1950

2,496,393

UNITED STATES PATENT OFFICE 2,496,393

MOUSE AND RAT TRAP

William L. Hayden, Bryn Mawr, Pa.

Application November 16, 1946, Serial No. 710,364

2 Claims. (Cl. 43—82)

The primary object of my invention is the provision of an animal trap of novel and superior design, and although adapted particularly for rats and mice, it operates in such a manner and may be constructed from larger parts so as to prevent larger animals from releasing themselves after having been caught by the springing of the trap.

The specific object of my invention is the manufacture of a spring operated trap of the jaw type such as is strong and durable in construction, which can be easily set and which is effective in operation.

Another object of my invention is the provision of a trap which can be produced from a number of parts and at a small cost, thus possessing all the features essential to marketability for a device of this character.

A further object of my invention is the provision of a jaw trap which will be easily placed in set position to insure the trapping of the animal by means of a spring operated jaw member, which first strikes the animal and subsequently presses and holds him securely to the base of the trap.

A special feature of my invention is the provision of a trap which will be sprung by the animal pulling with a minimum tension on the bait holder and such bait holder is easily visible and accessible, whenever the animal approaches from either direction on the base.

A further object of my invention is the provision of a spring jaw trap of this character, comprising complemental jaw members having a pair of looped jaws, which are centrally placed on the base at the midway portion thereof, all the remaining portions of the base being unobstructed when the trap is in set position.

A special feature of my invention is the provision of a very simple and effective bait holder or trigger which is suspended in a central location on the trap and operates to attract the rodent whenever in the vicinity of the base of the trap.

Other objects and advantages will appear and be better understood from the several modifications of my device, such as are portrayed on the drawings and are described in the detailed description in the specification.

Reference is now directed to the accompanying drawings forming a part of my specification, in which:

Figure 1 is a perspective view of my preferred modification of mouse and rat trap which is shown in the sprung position of the parts.

Figure 2 is a side elevation of the preferred form shown in Figure 1, the full lines showing the set position of the spring jaws, and the dotted lines showing the sprung position of the parts, as presented on Figure 1.

Figure 3 is an end elevation of my preferred form of trap, showing the set position of the trap parts in full lines.

Figure 4 is a plan view of the base and spring parts, as presented on Figure 1.

Figure 5 is a plan view of a modification of my rat and mouse trap, the complementary jaws being actuated by a pair of coil springs having parallel axes mounted on the base.

Referring to the several parts of my device, as shown on the drawings, wherein similar numerals of references are applied to corresponding parts, the numeral 1 denotes the elongated base, which is preferably made of wood for simplicity of construction. Secured to the base 1, as presented on Figure 1, are a pair of upstanding ears 2, 2, which may consist of a pair of staples of U-shaped construction driven into the base 1 adjacent the sides thereof and in the midway portion. Pivotally mounted within the ears 2, 2 are a pair of looped jaws 3, 3, each jaw being of rectangular formation and comprising an outer terminal crossbar 4, a pair of side bars 5, 5, an intermediate crossbar 7, and a bottom bar 6, which is disposed pivotally within the pair of ears 2, 2.

Surrounding the bottom bars 6, 6 of the companion looped jaws 3, 3 of Figure 1 are a pair of coil springs 8, 8 which are substantially axially alined and having outstretched terminals cooperating with the base at 11 and with one of the side bars of an adjacent jaw at 10, so as to normally actuate the jaws to the sprung position of the parts of the trap, as shown on Figure 1 in full lines, and on Figure 2 in dotted lines.

Pivotally attached to cross bar 4 is a combination bait holder and trigger 12, preferably comprising a continuous piece of wire having a pivotal connection at one end with one of the terminal cross bars, an intermediate looped portion for holding the bait, and a terminal detent portion for detachably engaging the other terminal cross bar, and adapted to normally hold the loop jaws in an upright position over the midway portion of the base and to release the jaws by a downward pull on the bait. The bait may be simply placed in the loop provided or may be attached as by a string or hook (not shown), but will in any case be freely suspended from the bait holder.

From the above description of the parts and their relation to each other it is seen that the operating springs 8, 8 normally press the terminal crossbars 4, 4 of the jaws 3, 3 down upon and over the ends of the base 1, such being obvious from an inspection of Figures 1, 4, and 5. The special feature of my looped jaw is the intermediate crossbar 7 which performs an important part in the trapping of the approaching animal, since it will strike and hold him if caught one-half of the distance between the transverse center line of the base 1 and the end portions thereof, as will easily be seen from an inspection of Figures 1, 4 and 5.

In the modified form of trap shown in Figure 5, there is presented a device which is stronger and adaptable for larger animals of the rodent type. The elongated base 1 of Figure 5 carries a pair of long coil springs 9, 9 which have parallel axes and are supported in a plurality of pairs of ears 2, 2, thereby holding all the parts in rigid assemblage. In Figure 5, I make use of the same type of looped jaw construction, as presented on Figure 1, each jaw being of rectangular formation and comprising an intermediate crossbar 7, in addition to the outer terminal crossbar 4, such relationship of parts being very effective in intercepting the approaching rodent when he disturbs the detent of the bait holder, if standing on any portion of the elongated base 1.

While two preferred embodiments of the invention are hereinbefore set forth, it is to be clearly understood that the invention is not to be limited to the exact constructions illustrated and described because various modifications of the details may be provided in putting the invention into practice within the purview of the appended claims.

What is claimed is:

1. In an animal trap, the combination of a base, upstanding ears secured to the top of the base adjacent its opposite sides and near the middle of said sides, a pair of looped jaws, each jaw comprising an outer terminal crossbar, a pair of side bars, and a bottom bar adapted to be positioned pivotally within a pair of said ears transversely of the said base, at least two coil springs surrounding the bottom bars of the jaws between the said ears and cooperating with the base and one of the side bars of each jaw to normally actuate the jaws to the sprung position of the trap, thereby placing the terminal crossbars over the end portions of the base, and a bait holder having a pivotal connection at one end with one of the terminal crossbars, means located intermediate to the ends of said bait holder for holding the bait in a freely suspended position, and a terminal detent portion for detachably engaging the other terminal crossbar by a downward movement of the bait holder, and adapted to normally hold the looped jaws in an upright position over the base.

2. In an animal trap, the combination of a base, upstanding ears secured to the top of the base adjacent opposite sides and near the middle of said sides, a pair of looped jaws, each jaw comprising an outer terminal crossbar, a pair of side bars, and a bottom bar adapted to be positioned pivotally within a pair of said ears transversely of the said base, a pair of axially aligned coil springs surrounding the bottom bars of the jaws between the said ears and cooperating with the base and one of the side bars of each jaw to normally actuate the jaws to the sprung position of the trap, thereby placing the terminal crossbars over the end portions of the base, and a bait holder having a pivotal connection at one end with one of the terminal crossbars, means located intermediate to the ends of said bait holder for holding the bait in a freely suspended position, and a terminal detent portion for detachably engaging the other terminal crossbar by a downward movement of the bait holder, and adapted to normally hold the looped jaws in an upright position over the base.

WILLIAM L. HAYDEN.

REFERENCES CITED

The following references are of record in the file of this patent:

UNITED STATES PATENTS

| Number | Name | Date |
|---|---|---|
| 372,292 | Becker | Nov. 1, 1887 |
| 462,343 | Wells | Nov. 3, 1891 |
| 794,856 | Firnhaber | July 18, 1905 |
| 809,203 | Miller | Jan. 2, 1906 |
| 1,401,011 | Telga | Dec. 20, 1921 |
| 1,405,229 | Kopke | Jan. 31, 1922 |
| 1,495,096 | Murphy | May 20, 1924 |
| 2,102,563 | Shanton | Dec. 14, 1937 |